March 22, 1949.　　　　　J. SWISS　　　　　2,465,296
METAL CHELATE STABILIZED ORGANIC SILICON
COMPOSITIONS AND PRODUCTS THEREOF
Filed Sept. 20, 1944　　　　　　　　　　　　2 Sheets—Sheet 1
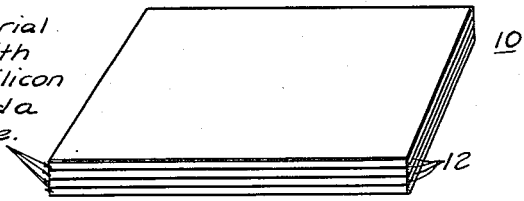
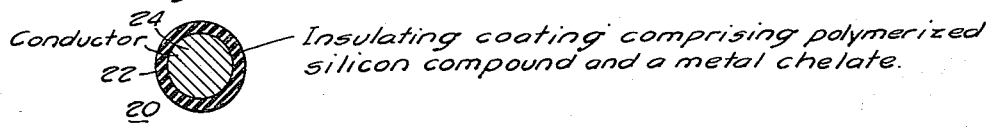
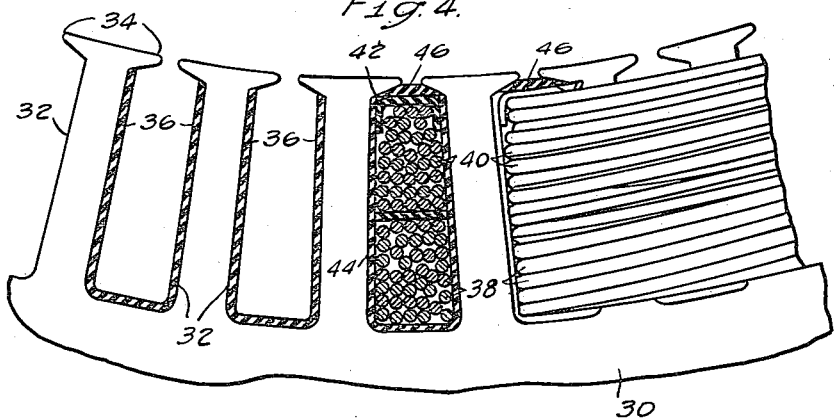
WITNESSES:　　　　　　　　　　　　　　INVENTOR
　　　　　　　　　　　　　　　　　　　　Jack Swiss.
　　　　　　　　　　　　　　　　　BY
　　　　　　　　　　　　　　　　　　　　ATTORNEY March 22, 1949.  J. SWISS  2,465,296
METAL CHELATE STABILIZED ORGANIC SILICON
COMPOSITIONS AND PRODUCTS THEREOF
Filed Sept. 20, 1944  2 Sheets-Sheet 2
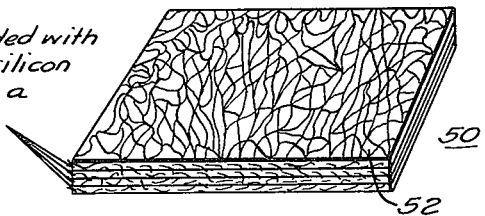
Mica flakes bonded with polyermerized silicon compound and a metal chelate.
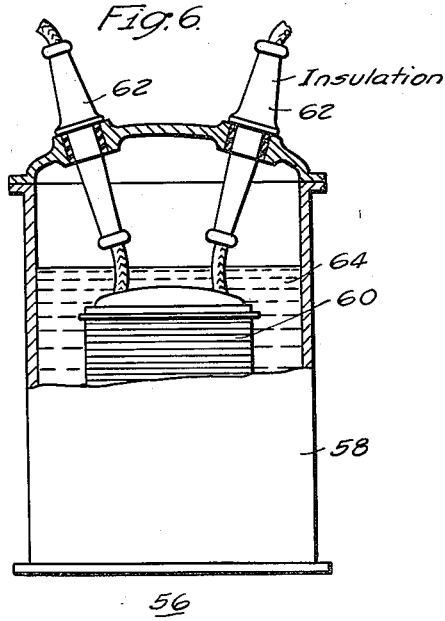
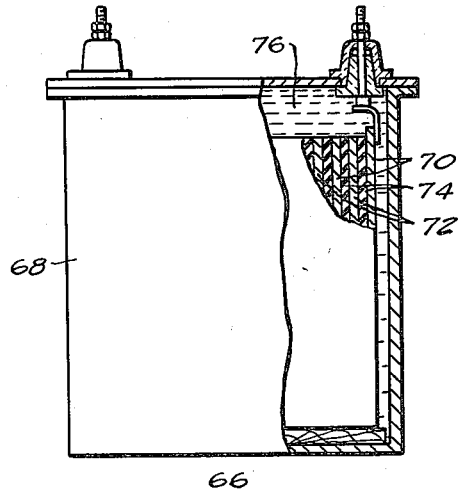
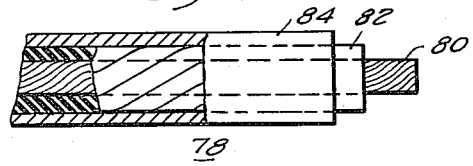
WITNESSES:
E. A. M<sup>c</sup>Closkey.
J. Shapoe
INVENTOR
Jack Swiss.
BY Ezra W. Savage
ATTORNEY

UNITED STATES PATENT OFFICE 2,465,296

METAL CHELATE STABILIZED ORGANIC SILICON COMPOSITIONS AND PRODUCTS THEREOF

Jack Swiss, McKeesport, Pa., assignor to Westinghouse Electric Corporation, East Pittsburgh, Pa., a corporation of Pennsylvania Application September 20, 1944, Serial No. 555,025

16 Claims. (Cl. 174—121)

This invention relates to stabilized resinous compositions and in particular to polymeric silicones.

Organic silicon compounds capable of being polymerized into liquids and solids may be prepared in several ways. The basic structural unit of the organic silicon compounds has the following general formula:

The R and $R_1$ each may be alkyl, alkenyl, aryl, aroxyaryl or other organic radicals, both saturated and unsaturated, or oxygen. A number of the basic organosilicon oxide units are polymerized or condensed through the alternate silicon-oxygen linkages to form polymeric substances which may be liquid, solid or gelatinous in nature. The polymeric organosilicon oxides will be referred to hereinafter as "silicones".

It is known that the organic silicones have better resistance to heat than most conventional organic compounds. Thus at a temperature 200° C. a petroleum oil will decompose into a charred mass in a few hours whereas a dimethyl silicone liquid polymer of a similar viscosity will only be gelled at this temperature after 45 hours. In a nitrogen atmosphere, a dimethyl silicone having an initial viscosity of 300 centistokes was heated for 150 hours at 190° C. and the only observable effect was an increase of viscosity to about 550 centistokes. Therefore the temperature resistance of the silicones is far superior to that of the organic compounds employed in industry heretofore.

At elevated temperatures, organic silicon polymers change in properties and deteriorate much more rapidly when exposed to oxygen than when maintained in a nonoxidizing atmosphere. For example, solid polymeric organic silicones, when applied as a smooth coating to a member, and heated in air at 250° C. will exhibit fine cracks in a few days. Since many of the possible useful applications of the silicone polymers depends on their use in air, it is highly desirable to inhibit or reduce the effect of an oxidizing atmosphere upon silicone polymers at elevated temperatures.

The object of this invention is to provide for maintaining predetermined properties of organic silicone polymers.

A further object of the invention is to provide a stable polymeric silicone liquid suitable for use at elevated temperatures in oxidizing atmospheres.

A still further object of the invention is to provide a stable solid silicone polymer that may be employed at elevated temperatures in oxidizing atmospheres without cracking or other adverse effects.

Another object of the invention is to provide for combining silicone polymers and metal chelate compounds to produce a composition resistant to the effects of oxygen at elevated temperatures.

Other objects of the invention will, in part, be obvious and will, in part, appear hereinafter. For a fuller understanding of the nature and objects of the invention, reference should be had to the following detailed description and drawing in which:

Figure 1 is a view in perspective of a laminated member embodying the invention;

Fig. 2 is a greatly enlarged view in cross section of a conductor coated with the composition of the invention;

Fig. 3 is an enlarged view in cross section of a conductor coated with the fibrous material and the composition of this invention;

Fig. 4 is a fragmentary view, partly in cross section, of a dynamoelectric machine embodying the composition of the invention;

Fig. 5 is a view in perspective of a member comprising mica flakes in the composition of the invention;

Fig. 6 is a view in elevation, partly in section, of a transformer;

Fig. 7 is a view in elevation, partly in section of a capacitor, and

Fig. 8 is a fragmentary view in elevation, partly in section, of a cable.

Organic silicones to be employed in the practice of the invention may be prepared by hydrolyzing organic silicon halides into silicols which readily condense into a polymer with loss of water. The following examples of the mono- and di-methyl silicon compounds are typical of the reaction:

(a) $CH_3SiCl_3 + 3H_2O \rightarrow CH_3Si(OH)_3 + HCl \rightarrow$

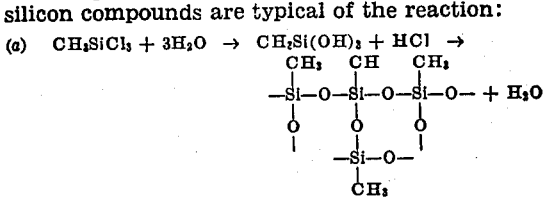

(b) $3(CH_3)_2SiCl_2 + 6H_2O \rightarrow 3(CH_3)_2Si(OH)_2 + 6HCl \rightarrow$

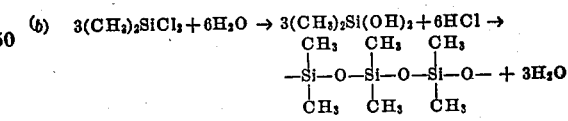

Organic silicones may also be produced in other ways as well. Another procedure is to form organic silicon ethoxides which may be hydrolized and condensed as illustrated in the following example:

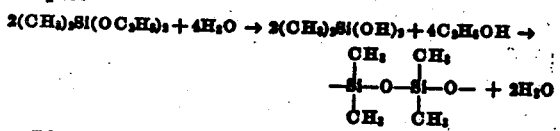

The initial organic silicon compound may comprise a mixture of the mono-, di- and tri-organic radical silicon halides or ethoxides. By fractional distillation or other mode of separation any particular compound may be isolated, and then hydrolyzed and condensed. Particular silicones may be readily prepared in this way. Further distillation may be resorted to in order to remove or separate any polymer desired.

In any case, the intermediate hydrolysis product is a silicol which tends to condense into a low organosilicon oxide polymer by loss of water. The simple low polymers so produced may be combined with dehydrating and condensing agents such as the mineral acids, organic borates, and the like to cause further condensation to produce intermediate condensation products of varying degrees of viscosity. In some cases mobile liquids are produced while in other cases much more highly condensed products are produced which are of a syrupy or even gummy nature. Depending on the intended use the condensation may be carried out to produce intermediate silicone polymers within a wide range of fluidity. The intermediate condensation products are usually soluble in organic solvents such at toluene, xylene and the like.

In case liquid or lubricant types of silicone polymers are ultimately desired, the essentially all dialkyl silicon compounds are separated out by fractionation before polymerization. The essentially dimethyl silicon compounds are preferred for their stability and the wide range of viscosities available. For this purpose, either the dimethyl silicon dichloride or the dimethyl silicon diethoxide are secured by fractionation and are hydrolized to silicols and finally condensed to dimethyl silicon oxides. The presence of the trimethyl derivatives is not objectionable and in some cases is beneficial, but the mono-methyl compounds are objectionable. Mineral acids such as hydrochloric acid or sulphuric acid may be employed as the condensing agent to produce a dimethyl silicone polymer of predetermined viscosity. Fractional distillation of the dimethyl silicon oxide polymers to eliminate light fractions will yield a product of considerable uniformity. One of the most significant properties of the dimethyl silicone fluids is the extremely flat temperature-viscosity curve. This enables the use of the one dimethyl silicone fluid as a lubricant for a given bearing or other apparatus whether subjected to high temperatures or extremely low temperatures. If a given dimethyl silicone fluid is best suited for a given lubricating application at an intermediate temperature the viscosity will not change sufficiently in most cases to warrant a different silicone from the coldest winter temperatures to the highest summer heat.

According to the present invention, it has been discovered that polymeric silicones including both the fluid silicone polymers and the solid polymeric silicones may be stabilized against deterioration when exposed to an oxidizing atmosphere at elevated temperatures by adding thereto a metal chelate. The metal chelates may be derived by reacting a metal or metal oxide or other metal compound with an organic compound of the following general formula:

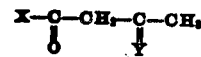

where X is selected from the group consisting of hydrocarbon, alkoxy, and hydrocarbon substituted amino radicals, and Y is selected from the group consisting of oxygen, and hydrocarbon substituted imino radicals, the substituted imino radicals being present only when X is a hydrocarbon radical. A typical metal chelate is chromium acetylacetonate believed to have the following structural formula:

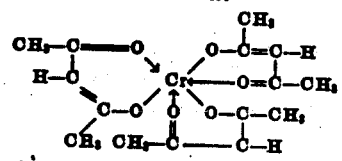

Other typical metal chelates are copper N,N'-ethyleneimine-bis-acetylacetonate; copper ethyl acetoacetate and chromium ethyl acetoacetate.

The structural formula for copper N,N',-ethyleneimine-bis-acetylacetonate is

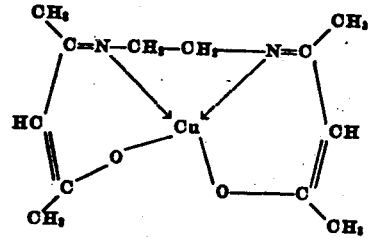

Metals of every group of the periodic table have been found to form metal chelates suitable for the practice of the invention. The ethyl acetoacetates of the following metals have been prepared and found to be effective:

| | |
|---|---|
| Potassium | Lead |
| Copper | Vanadium |
| Silver | Bismuth |
| Gold | Chromium |
| Barium | Uranium |
| Cadmium | Molybdenum |
| Cerium | Tungsten |
| Aluminum | Manganese |
| Thallium | Iron |
| Thorium | Cobalt |
| Tin | Nickel |

As little as 0.01% of the metal chelate when added to an organic silicone polymer has markedly improved its stability. Metal chelates have been incorporated in silicones in amounts of as high as the order of 10% with good results. Accelerated tests were made at 250° C. to determine the time to cause a fluid dimethyl silicone polymer exposed to air to gel and then dry hard with various proportions of several metal chelates. The following examples are typical:

EXAMPLE I

*Copper ethyl acetoacetate*

| Per cent of chelate | Gelation time, hours | Drying time, hours |
|---|---|---|
| 0.0 | | |
| 0.02 | 2 | 16 |
| 0.04 | 16 | 24 |
| 0.06 | 38 | 240 |
| 0.1 | 130 | 480 |
| 0.2 | 130 | 480 |
| | 2,160 | |

EXAMPLE II

*Copper N,N'-ethyleneimine-bis-acetylacetonate*

| Per cent of chelate | Gelation time, hours | Drying time, hours |
| --- | --- | --- |
| 0.1 | 36 | 150 |
| 0.5 | 36 | 174 |
| 1.0 | 36 | 174 |
| 2.0 | 36 | 250 |
| 5.0 | 36 | 150 |

EXAMPLE III

*Chromium ethyl acetoacetate*

| Per cent of chelate | Gelation time, hours | Drying time, hours) |
| --- | --- | --- |
| 0.05 | 38 | 254 |
| 0.1 | 60 | 294 |
| 0.2 | 104 | 302 |

In another test a dimethyl silicone liquid polymer with 0.2% copper ethyl acetoacetate having a viscosity of 2,089 centistokes was heated in contact with air for 30 days at 200° C. The viscosity of the fluid silicone at the end of the test was 2,138 centistokes.

The metal chelates may be incorporated in the polymeric silicones by dissolving the metal chelates in a solvent such, for example, as toluene and admixing in a solution of the intermediate partially polymerized silicone dissolved in a solvent, which likewise may be toluene. In incorporating the metal chelates in a fluid dimethyl silicone, the metal chelate may be powdered and dissolved directly in the dimethyl silicone.

It has been discovered that the fluid dimethyl silicone polymers are best treated with the metal chelates by dissolving the powdered metal chelate in the fluid silicone and then heating to a temperature of from 200° C. to 250° C. The heat treatment at this elevated temperature imparts much better oxidation resistance to the composition. Dimethyl silicone fluids used below 200° C. lasted much longer before gelling when first heat treated with the added chelate at 250° C. than fluids containing the same proportion of chelate but not so heat treated.

The metal chelates do not appear to exert any significant inhibiting effect on the condensation and polymerization of the silicone polymers. As an example, to an allyl methyl silicone copolymer in solution in a volatile solvent there was added 1/10 of 1% of copper ethyl acetoacetate and 0.1% of benzoyl peroxide and the solution was applied to a sheet material and baked for 6 hours at 250° C. The silicone copolymer hardened to a dry resinous state as readily as the same composition without the metal chelate. However, the copolymer containing the metal chelate showed a greatly improved resistance to oxygen at elevated temperatures as compared to the same copolymer without the chelate.

One of the marked drawbacks of solid silicone polymers when used at elevated temperatures has been the fact that solid polymers are subject to shrinking and cracking after a few days' exposure to air. Thus solid methyl silicones and phenyl ethyl silicones when exposed to air at 250° C. will crack in from 3 to 18 days, even though the resinous material otherwise appears to be satisfactory. There is definite evidence that exposure to oxygen at these elevated temperatures causes a loss in weight of the silicone polymers, presumably due to oxidation and volatilization. By incorporating small quantities of metal chelates therein, films of solid methyl silicones were still flexible and continuous without any visible cracks after more than 6 months' exposure to air at 250° C. Therefore, the effective life of the electrical insulation and other members prepared from solid silicone polymers may be increased many times by incorporating a small amount of a metal chelate of the type described herein.

Referring to Fig. 1 of the drawing, there is illustrated a sheet member 10 composed of a plurality of sheets 12 of an inorganic material such, for example, as asbestos cloth or glass fiber cloth initially impregnated with a polymerizable organic silicon oxide embodying a minor proportion of a metal chelate described herein. The metal chelate will not appreciably lengthen the time required for polymerization of the organic silicon oxide to its final condition by heat. When heat treated to convert the organic silicon oxide impregnant to a solid silicone, the bonded sheet 10 may be employed for various purposes. Such sheets are particularly suitable for electrical insulating applications in electrical apparatus. The member 10 may be made into slot-cell liners, spacers, coil wrapping, support members and other forms of insulating structures. In view of the excellent resistance to high temperatures without deterioration, the member will enable the preparation of apparatus capable of withstanding prolonged exposures at elevated temperatures.

In Fig. 2 of the drawing, there is illustrated a cross section of a conductor 24 insulated with a polymerized silicone carrying a stabilizing metal chelate therein. The organosilicon oxide compound may be applied initially in solution in the form of a wire enamel composed of a low polymer to the conductor 24 and when baked at an elevated temperature a hard dry resinous insulating enamel coating 22 will be produced on the metallic conductor 24. The resulting insulated wire 20 may be employed in producing magnetic coils, motor windings, and other electrical members. In view of the excellent resistance to oxidation of the stabilized silicone polymer, the electrical members produced from the conductor 20 so insulated may be employed at elevated temperatures for prolonged periods of time heretofore impractical with ordinary organic enamels.

In many cases, it is desirable to employ the insulated conductor 26 illustrated in Fig. 3 in which the copper or other metal conductor 24 is insulated with a layer 28 of inorganic fibrous material impregnated with a polymerized silicone compound and a metal chelate. The conductor 24 may be first wrapped with a fibrous material such as asbestos or continuous filament glass fibers or glass sliver or yarn and then impregnated with one or more coatings of partially polymerized organosilicon oxide carrying a small amount of a metal chelate therein. After baking for several hours at temperatures of from 225° C. to 275° C., a hard highly insulative silicone resin combined with the fibrous insulation will be present on the conductor.

Referring to Fig. 4 of the drawings, there is illustrated a section of a dynamoelectric stator embodying the silicone resin members such as shown in Figs. 1, 2 and 3. The magnetic core 30 provided with slots 32 having lips 34 forming restricted openings may be lined with a slot-cell liner 36 formed of material similar to that shown in Fig. 1. The phase windings 38 and 40 wound in the slots 32 may be either one of the types of insulated conductors 20 or 26 depending on the amount of insulation and space factor required. The insulating phase separator 44 and the winding cover 42, as well as the wedge 46 may be prepared from a composition similar to that shown in Fig. 1. A dynamoelectric machine insulated with the stabilized silicone polymers of this invention may be operated with a higher output per unit weight than is possible with electrical machines produced with conventional organic resins heretofore known to the art. In one case a motor frame normally delivering 3 horsepower when wound with ordinary organic enamel insulated wire and with paper liners, delivered 10 horsepower continuously when insulated with silicone resins and glass fibers. In many cases the apparatus embodying silicones will stand extreme overloads without harmful results. Street-car motors and other electrical equipment may be advantageously produced with silicone resins applied as shown in Fig. 4.

The moisture resistance of the silicone polymers is outstanding. Coupled with the fact that the metal chelates reduce or eliminate the cracking of the solid silicone resins at elevated temperatures, the silicone insulation of this invention is particularly resistant to moisture.

A coil was made from copper wire covered with only glass fiber insulation and the coil was dipped into a composition composed of an intermediate polymeric methyl silicon oxide, 325 mesh mica dust present in an amount equal to 33% of the weight of the silicone and 0.1% copper ethyl acetoacetate. After baking the silicone resin impregnated coil to a hard, dry condition, the coil was heated for 60 days at 250° C. exposed to the atmosphere. The coil was then immersed in water for 48 hours. The insulation resistance was tested while the coil was half immersed in water and found to be over 200,000 megohms.

The resinous silicone polymers may be applied to mica flakes as a binder. Illustrated in Fig. 5 of the drawing is a member 50 composed of mica flakes 52 bonded with an organic silicone polymer stabilized with a small amount of metal chelate. The metal chelate and silicon oxide polymer in an intermediate state may be applied in solution to the mica flakes in a conventional manner and baked to drive off the solvent and to continue the condensation and the polymerization of the organosilicon oxide resin to a relatively hard state. The mica member may be used in making commutator segments, V-rings and similar electrical insulation by suitable forming and machining operations. The combination of mica and stabilized silicones is highly resistant to the deteriorating effects of elevated temperatures.

Mica tape and mica wrapper may be prepared by laying a thin layer of mica flakes on an inorganic tape or cloth composed of glass or asbestos fibers and applying thereto and heat treating a solution of intermediate polymeric organic silicon oxide polymer with metal chelate addition to impregnate the fabric and to bond the mica flakes and the fabric. The mica tape and wrapper is quite flexible and may be applied to conductors and coils where the benefits of its excellent temperature resistance render its use highly advantageous.

The fluid dialkyl silicone polymers are quite stable and have excellent dielectric properties and for this reason may be employed as heat dissipating and insulating dielectric liquids in apparatus such as the transformer 56 shown in Fig. 6, the capacitor 66 shown in Fig. 7 and the cable 78 shown in Fig. 8 of the drawings. The stabilized dimethyl silicone fluids are particularly useful as a transformer dielectric. The transformer 56 shown in Fig. 6 of the drawings comprises a casing 58 in which is disposed an electrical member 60 composed of a magnetic core and coils with leads extending through the bushings 62 passing through the casing. The electrical member 60 is immersed in a fluid dielectric 64 composed of the dimethyl silicone plus a small amount of metal chelate stabilizer. In present-day practice, transformers employ highly refined petroleum oils or halogenated hydrocarbons as the dielectric fluid which require a hermetically sealed casing in order to prevent deterioration of the dielectric resulting from exposure to the atmosphere. The dimethyl silicones may be operated at temperatures of 100° C. or even higher indefinitely when metal chelates are applied thereto. A hermetically sealed casing is not necessary for use with the dimethyl silicone since any moisture inadvertently entering will immediately boil out at these temperatures. Oxygen does not cause the dimethyl silicones to form a sludge or other deleterious material such as occurs when hot oil is subjected to oxygen. A transformer may be operated at a higher output per unit weight with the dimethyl silicones as compared to present dielectric liquids, since the dimethyl silicones permit a higher operating temperature without untoward results. It will be understood that the solid insulation on the conductors and the spacers for the electrical member 60 will be prepared from solid silicones combined with metal chelates applied alone or in combination with inorganic fibers or flake material.

The capacitor 66 shown in Fig. 7 comprises a sealed casing 68 within which is disposed a pair of metal electrodes 70—72 separated by an insulating sheet material 74. The electrical capacitor electrodes are immersed in the fluid dielectric 76 composed of a fluid dimethyl silicone and a metal chelate dissolved therein. The excellent dielectric properties of the dimethyl silicones and their ability to withstand elevated temperatures will permit a higher output from a given capacitor unit than is obtainable with conventional capacitor dielectrics such as oil or halogenated hydrocarbons.

Referring to Fig. 8 of the drawing, the cable 78 is composed of a conductor 80 to which sheet fibrous insulation 82 is applied, the whole being enclosed in a metal sheet 84 of lead or other suitable material which contains a fluid dimethyl silicone dielectric impregnating the fibrous insulation 82.

It will be apparent that the metal chelates may be applied to polymeric silicones, both liquid and solid, in order to improve their properties at elevated temperatures. No adverse effects have been met either electrically or chemically when the metal chelates are incorporated in the silicones.

Metal chelates may be prepared from various base compounds of the formula

where X and Y are radicals previously described. Compounds, for example, as acetylacetone, ethyl acetoacetate, acetoacetanilide, and acetoacet-o-toluidide and the like may be reacted with metals, metal oxides, metal carbonates and the like. As an example, 20 grams of ethyl acetoacetate were heated with an excess of basic copper carbonate for 2 hours at 100° C. with a slight amount of water. The resulting liquid was dark green. 500 cc. of toluene was added and the solution refluxed for a few minutes. The toluene solution was filtered and again refluxed until no crystals separated on cooling. The solution could be applied directly to solutions of polymeric silicones. In another case, 10 cubic centimeters of acetylacetone was refluxed with 5 grams of solid chromium chloride (CrCl₃×H₂O) for one hour. The mixture was extracted with hot toluene. The green solution after standing over night had turned dark red. Red crystals were also precipitated from solution on standing. After distilling to concentrate the solution, about 2 grams of dark red crystals comprising the chromium chelate were obtained. The other metal chelates may be made in an analogous manner.

It should be understood that the term "metal" used in the specification and claims in defining the chelate may be the free metal or metal in compound form, such, for instance as oxides or carbonates.

Since certain changes in carrying out the above processes and certain modifications in the apparatus and applications embodying the materials produced by the processes of the invention may be made without departing from its scope, it is intended that all the matter contained in the above description or shown in the accompanying drawings shall be interpreted as illustrative and not in a limiting sense.

I claim as my invention:

1. A composition of matter comprising, in combination, an organosilicon oxide polymer and a minor proportion of a metal chelate derived by reacting a metal with a compound of the formula

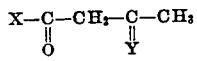

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the organic substituents of the organosilicon oxide polymer consisting essentially of monovalent hydrocarbon radicals attached to silicon through carbon silicon linkages.

2. A composition of matter comprising, in combination, a solid organosilicon oxide polymer and a minor proportion of a metal chelate derived by reacting a metal with a compound of the formula

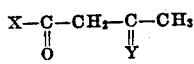

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the organic substituents of the organosilicon oxide polymer consisting essentially of monovalent hydrocarbon radicals attached to silicon through carbon silicon linkages.

3. A composition of matter comprising, in combination, a liquid organosilicon oxide polymer and a minor proportion of a metal chelate derived by reacting a metal with a compound of the formula

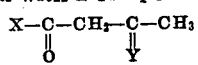

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the organic substituents of the organosilicon oxide polymer consisting essentially of monovalent hydrocarbon radicals attached to silicon through carbon silicon linkages.

4. A lubricant composition comprising a major proportion of a liquid polymeric dimethyl silicon oxide and a minor proportion of a metal chelate derived by reacting a metal with a compound of the formula

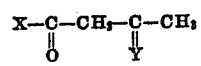

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the dimethyl silicon oxide having the methyl groups attached directly to silicon by carbon silicon linkages.

5. The method of preparing a heat and oxidation resistant lubricant for use at temperatures of up to about 250° C. which comprises combining a liquid polymeric dimethyl silicon oxide with a minor proportion of a metal chelate derived by reacting a metal with a compound of the formula

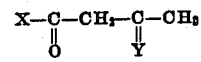

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, and heating the mixture at a temperature of from about 200° C. to about 250° C., the dimethyl silicon oxide having the methyl groups attached directly to silicon by carbon silicon linkages.

6. An article of manufacture comprising an inorganic sheet material treated with a composition comprising an organic silicon oxide polymer and a metal chelate derived by reacting a metal with a compound of the formula

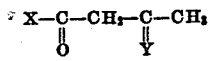

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the organic substituents of the organosilicon oxide polymer consisting essentially of monovalent hydrocarbon radicals attached to silicon through carbon silicon linkages.

7. An article of manufacture comprising glass fibers treated with a composition comprising an organic silicon oxide polymer and a metal chelate derived by reacting a metal with a compound of the formula

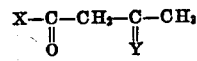

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the organic substituents of the organosilicon oxide polymer consisting essentially of monovalent hydrocarbon radicals attached to silicon through carbon silicon linkages.

8. An article of manufacture composed of mica flakes and a binder for the mica flakes, the binder composed of an organic silicon oxide polymer and a metal chelate derived by reacting a metal with a compound of the formula

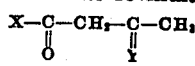

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the organic substituents of the organosilicon oxide polymer consisting essentially of monovalent hydrocarbon radicals attached to silicon through carbon silicon linkages.

9. An insulated electrical conductor comprising, in combination, a conductor and insulation applied thereto comprising a polymeric organosilicon oxide and a metal chelate derived by reacting a metal with a compound of the formula

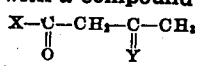

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the organic substituents of the organosilicon oxide polymer consisting essentially of monovalent hydrocarbon radicals attached to silicon through carbon silicon linkages.

10. An insulated electrical conductor comprising, in combination, a conductor and insulation applied thereto comprising a wrapping of inorganic fibrous material, a polymeric organosilicon oxide and a metal chelate derived by reacting a metal with a compound of the formula

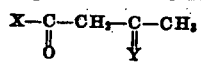

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the organic substituents of the organosilicon oxide polymer consisting essentially of monovalent hydrocarbon radicals attached to silicon through carbon silicon linkages.

11. Electrical apparatus comprising, in combination, an electrical member, a casing for the electrical member, and a fluid dielectric within the casing applied to the electrical member, the fluid dielectric comprising a major proportion of a liquid polymeric dimethyl silicon oxide and a minor proportion of a metal chelate derived by reacting a metal with a compound of the formula

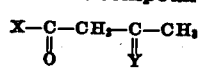

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the dimethyl silicon oxide having the methyl groups attached directly to silicon by carbon silicon linkages.

12. Electrical apparatus comprising, in combination, a casing, a magnetic core and an electrical conductor wound on the magnetic core disposed in the casing, solid insulation applied to the conductor, the solid insulation comprising a solid polymeric organic silicon oxide and a metal chelate derived by reacting a metal with a compound of the formula

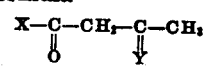

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, and a fluid dielectric within the casing applied to the magnetic core and electrical conductor, the fluid dielectric comprising, in combination, an organosilicon oxide polymer and a minor proportion of a metal chelate derived by reacting a metal with a compound of the formula

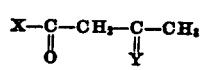

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the organic substituents in both the solid and liquid silicon oxide polymers comprising essentially hydrocarbon groups attached directly to silicon by silicon carbon linkages.

13. An electrical cable comprising a conductor, fibrous insulation disposed on the conductor, a sheath applied about the conductor and applied fibrous insulation and a fluid dielectric applied to fibrous insulation, the fluid dielectric comprising a liquid polymeric organic silicon oxide and a metal chelate derived by reacting a metal with a compound of the formula

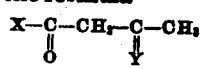

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the organic substituents of the organosilicon oxide polymer consisting essentially of monovalent hydrocarbon radicals attached to silicon through carbon silicon linkages.

14. An electrical cable comprising a conductor, fibrous insulation disposed on the conductor, a sheath applied about the conductor and applied fibrous insulation and a fluid dielectric applied to fibrous insulation, the fluid dielectric comprising a liquid polymeric dimethyl silicon oxide and a metal chelate derived by reacting a metal with a compound of the formula

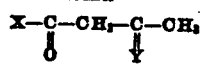

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, the dimethyl silicon oxide having the methyl groups attached directly to silicon by carbon silicon linkages.

15. A composition comprising a partially polymerized organic silicon oxide, a metal chelate derived by reacting a metal with a compound of the formula

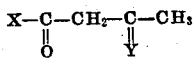

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, and a solvent for the partially polymerized silicone and the metal chelate, the organic substituents of the organosilicon oxide polymer consisting essentially of monovalent hydrocarbon radicals attached to silicon through carbon silicon linkages.

16. In the process of producing a composition for application to members comprising dissolving a partially polymerized organic silicon oxide polymer in a solvent, dissolving in another amount of solvent a metal chelate derived by reacting a metal with a compound of the formula

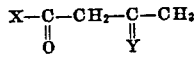

where X is selected from the group consisting of hydrocarbon, alkoxy, and hydrocarbon substituted amino radicals and Y is selected from the group consisting of oxygen, and hydrocarbon substituted imino radicals, the substituted imino radical being present only when X is a hydrocarbon radical, and admixing the two solutions, the organic substituents of the organosilicon oxide polymer consisting essentially of monovalent hydrocarbon radicals attached to silicon through carbon silicon linkages.

JACK SWISS.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,222 | Rochow | Oct. 7, 1941 |
| 2,307,075 | Quattlebaum | Jan. 5, 1943 |
| 2,371,050 | Hyde | Mar. 6, 1945 |
| 2,371,068 | Rochow | Mar. 6, 1945 |
| 2,377,689 | Hyde | June 5, 1945 |

FOREIGN PATENTS

| Number | Country | Date |
|---|---|---|
| 548,911 | Great Britain | Oct. 29, 1942 |

OTHER REFERENCES

Kipping, Tr. J. Chemical Soc. (London), vol. 101, 1912, pp. 2106 and 2107.

Stock, Hydrides of Boron and Silicon, Cornell U. Press 1933, page 20.

Hackh's, Chemical Dictionary, Blakiston (Phila.) 1937, 2nd ed. page 847.